(12) United States Patent
Makowski et al.

(10) Patent No.: US 11,113,446 B2
(45) Date of Patent: Sep. 7, 2021

(54) YIELD IMPROVING LEAF CELLS OPTIMIZATION FOR SEMICONDUCTOR NETLISTS

(71) Applicant: International Business Machines Corporation, Armonk, NY (US)

(72) Inventors: Thomas Makowski, Pfullingen (DE); Matthias Ringe, Tuebingen (DE); Andreas H. A. Arp, Nufringen (DE); Michael V. Koch, Ehningen (DE); Fatih Cilek, Boeblingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/747,009

(22) Filed: Jan. 20, 2020

(65) Prior Publication Data
US 2021/0224462 A1    Jul. 22, 2021

(51) Int. Cl.
*G06F 30/398* (2020.01)
*G06F 119/18* (2020.01)

(52) U.S. Cl.
CPC ........ *G06F 30/398* (2020.01); *G06F 2119/18* (2020.01)

(58) Field of Classification Search
CPC ............................ G06F 30/398; G06F 2119/18
See application file for complete search history.

(56) References Cited

U.S. PATENT DOCUMENTS

| | | | |
|---|---|---|---|
| 8,347,248 B2 | 1/2013 | Serdar et al. | |
| 8,875,082 B1 * | 10/2014 | Sircar | G06F 30/39 716/134 |
| 9,773,083 B1 | 9/2017 | Das et al. | |
| 10,318,691 B2 | 6/2019 | Sarrazin et al. | |
| 2016/0225752 A1* | 8/2016 | Chou | G06F 30/392 |
| 2019/0065656 A1 | 2/2019 | Chakraborty et al. | |

* cited by examiner

*Primary Examiner* — Vuthe Siek
(74) *Attorney, Agent, or Firm* — Cantor Colburn LLP; L. Jeffrey Kelly

(57) ABSTRACT

A computer system improves a production yield of a semiconductor chip described by design data. The computer system includes a synthesis controller in signal communication with a yield optimization controller. The synthesis controller generates design data representing a design implementation of the semiconductor chip. The yield optimization controller extracts timing information from the design data. The timing information describes a slack related to a timing path within the semiconductor chip. The yield optimization controller further identifies one or more one yield improvable cells described by the design data, and determines from the design data an adverse impact of yield improvement on the slack. Based on the timing information and the determined adverse impact, the yield optimization controller calculates a subset of the yield improvable cell, and modifies the subset of the yield improvable cell so that the production yield is improved.

15 Claims, 7 Drawing Sheets

YIELD IMPROVING LEAF CELLS OPTIMIZATION FOR SEMICONDUCTOR NETLISTS

BACKGROUND

The present invention relates generally to the field of semiconductor design and fabrication, and more particularly, to a method and system configured to improve semiconductor fabrication yield.

The ultimate goal of the semiconductor fabrication process is to produce error-free working dies without producing faulty dies. The quantitative measure of the quality of a semiconductor process is referred to as "yield" and is typically defined as the fraction of dies on the yielding wafers that are not deemed faulty and discarded during the manufacturing process. In other words, the yield is a quantitative measurement of the process quality in terms of the number of error-free working dies produced from a given fabrication process versus the number of faulty dies. In practice, however, the semiconductor fabrication process is never perfect and not all dies work or operate error-free as desired within specs.

SUMMARY

According to an embodiment described herein, a computer-implemented method is provided for improving a production yield of a semiconductor chip described by design data. The computer-implemented method comprises extracting timing information from the design data, and identifying at least one yield improvable cell described by the design data. The timing information describes a slack related to a timing path within the semiconductor chip. The method further comprises determining from the design data an adverse impact of yield improvement on the slack, and based on the timing information and the determined adverse impact, calculating a subset of the at least one yield improvable cell. The method further comprises modifying the subset of the at least one yield improvable cell so that the production yield is improved.

According to another non-limiting embodiment, a computer system improves a production yield of a semiconductor chip described by design data. The computer system includes a synthesis controller in signal communication with a yield optimization controller. The synthesis controller generates design data representing a design implementation of the semiconductor chip. The yield optimization controller extracts timing information from the design data. The timing information describes a slack related to a timing path within the semiconductor chip. The yield optimization controller further identifies one or more one yield improvable cells described by the design data, and determines from the design data an adverse impact of yield improvement on the slack. Based on the timing information and the determined adverse impact, the yield optimization controller calculates a subset of a yield improvable cell, and modifies the subset of the yield improvable cell so that the production yield is improved.

According to yet another non-limiting embodiment, a computer program product is provided for improving a production yield of a semiconductor chip described by design data. The computer program product includes a computer readable storage medium having program instructions embodied therewith. The program instructions are readable by a processing circuit to cause the processing circuit to perform a method comprising extracting, via a yield optimization controller, timing information from the design data. The timing information describes a slack related to a timing path within the semiconductor chip. The method further comprises identifying, via a yield optimization controller, at least one yield improvable cell described by the design data, and determining, via a yield optimization controller, an adverse impact of yield improvement on the slack from the design data. The method further comprises based on the timing information and the determined adverse impact, calculating, via a yield optimization controller, a subset of the at least one yield improvable cell, and modifying, via a yield optimization controller, the subset of the at least one yield improvable cell so that the production yield is improved Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
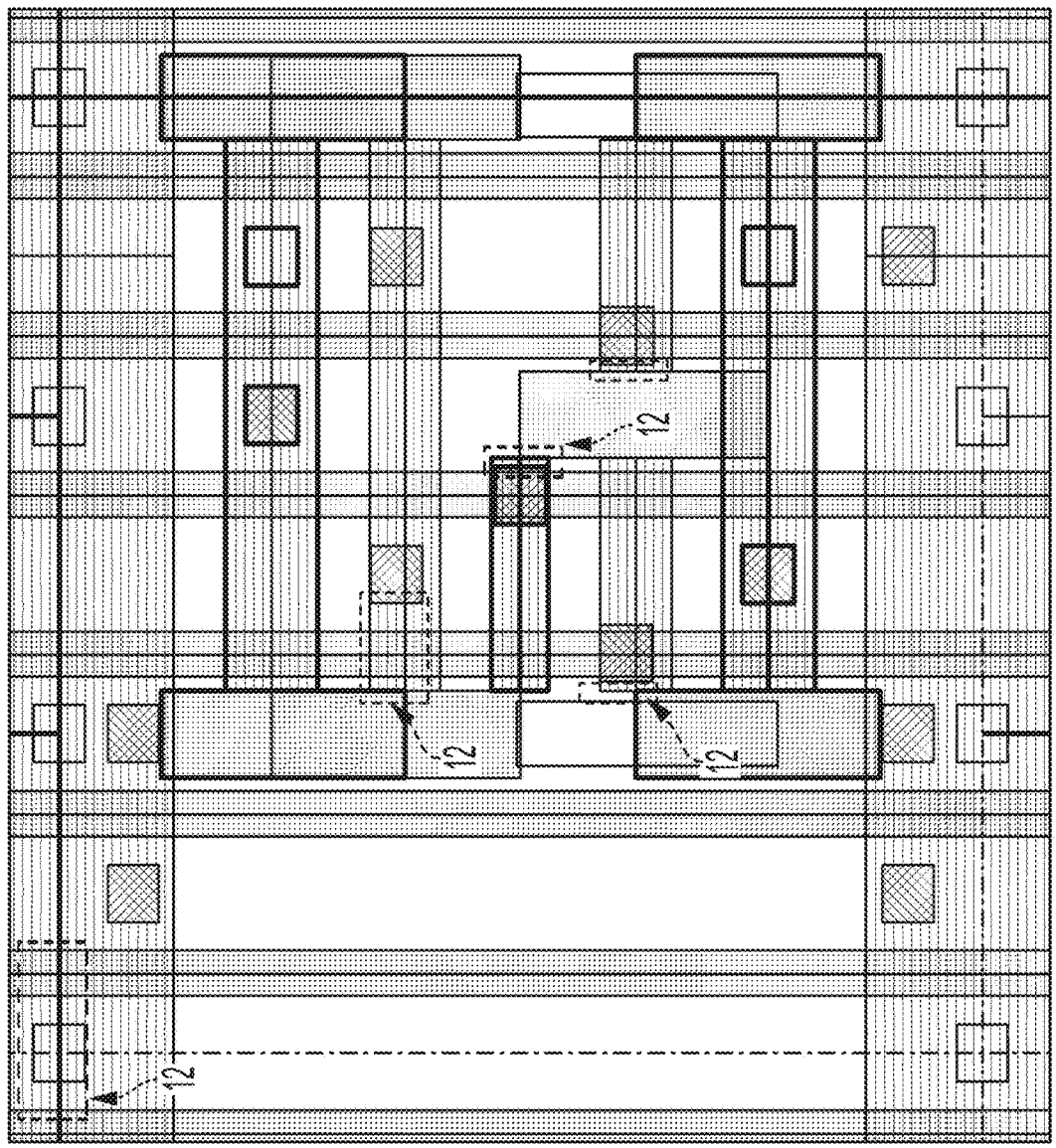
FIG. 1 depicts a layout logic cell for fabricating an integrated circuit (IC)

FIG. 1, for example, illustrates a layout logic cell 10 for fabricating an integrated circuit (IC) aimed for maximizing the performance speed of an integrated circuit. When designing a logic cell 10 aimed for maximizing the performance speed of an integrated circuit, transistor devices are typically placed as close to one another as possible within a given cell in order to reduce timing paths. The gain in speed is a result of decreased capacitance due to the close proximity of the logic components and timing paths and therefore short wiring connections. The ability to reduce capacitance can be difficult when employing sea of metal design approaches and could cause less spacings between routing structures like as indicated by dashed regions 12.

Placement and power constraints forces in the front end (e.g., silicon region or substrates) of some cells to implement a higher percentage of dummy lines. The cut shapes employed in sea of metal wiring designs (sometimes simply referred to as "sea of metal") have to be in the cells to get the functionality. As a result, the design of the cells cannot be changed afterwards by the router.

Figure 2:
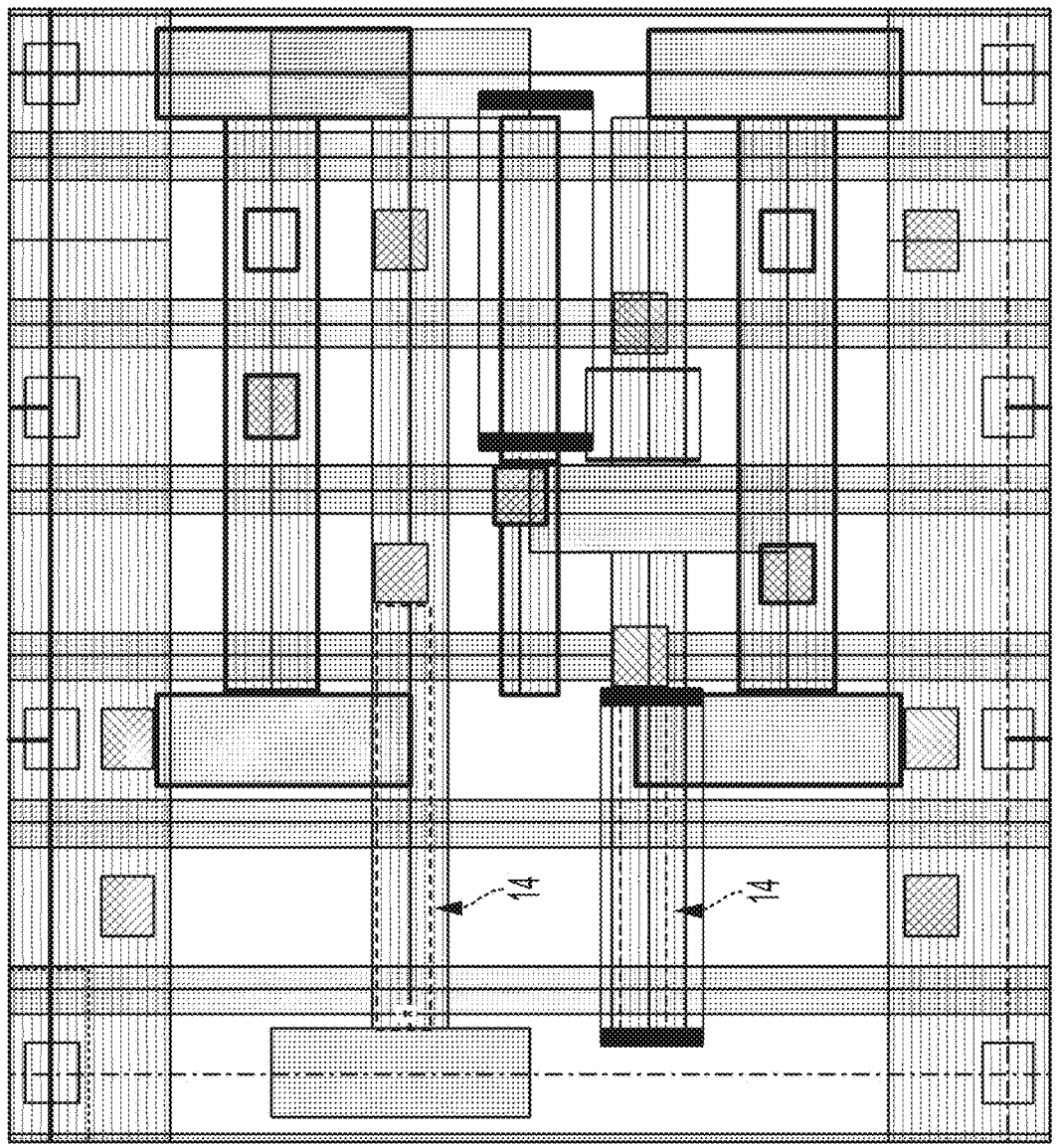
FIG. 2 depicts a layer of another logic cell for fabricating an IC.

In terms of improving yield, the design rules can be expanded from a minimum required design to a maximum yield improved design (see FIG. 2). This strategy, however, increases timing signals and creates additional wiring capacitance. Regions of additional or increased capacitances are indicated by dashed regions 14.

The traditional design process ("non-sea-of-metal designs", sometimes referred to an electronic design automation (EDA) process) can employ a yield optimization process after synthesizing with routing as the cell has no internal cut shapes. As a result, sea of metal design approaches make it difficult to optimize the yield.

Various non-limiting embodiments described herein provide a system capable of improving a production yield of a semiconductor chip design process without negatively effecting the cell timing. In at least one embodiment, the system includes a yield optimization controller configured to determine a set of yield improvable cells described by a gate level netlist generated during a synthesis process, but prior to performing routing process. In this manner, the yield optimization controller can determine an adverse impact of yield improvement on the slack associated with a given timing path, based on the timing information and the determined adverse impact, calculate a subset of the set of yield improvable cells, and modify a subset of yield improvable cells so that the production yield is improved without negatively effecting the optimized timing of the cell.

Figure 3:
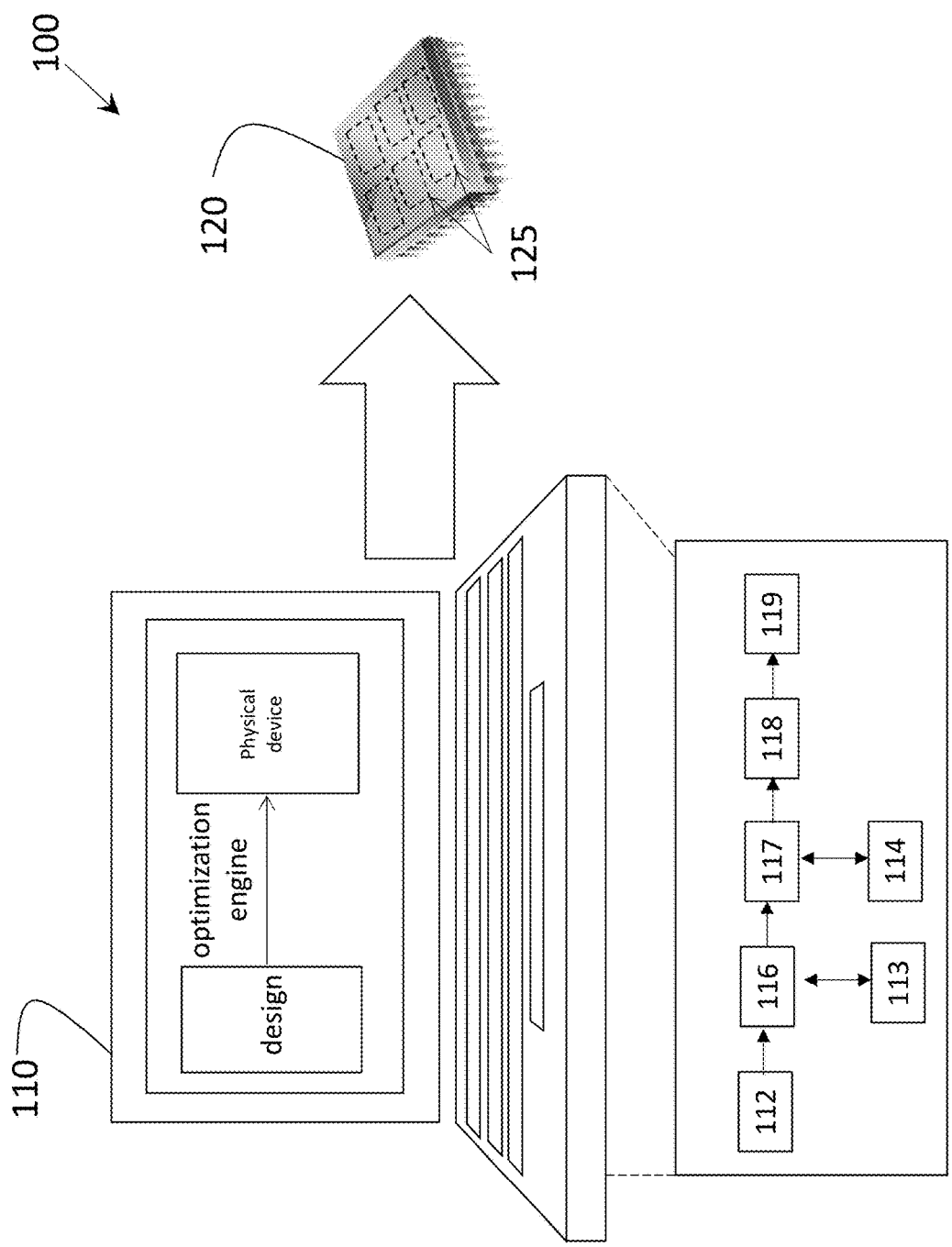
FIG. 3 is a block diagram of a semiconductor design and layout system according to a non-limiting embodiment of the invention.

With reference now to FIG. 3, a semiconductor design and layout system 100 configured to perform out-of-context feedback optimization on a physical design such as a semiconductor chip, for example, is illustrated according to a non-limiting embodiment. The semiconductor design and layout system 100 includes a processing system 110 (e.g., computer) that implements one or more computer processors such as, for example, an electronic hardware synthesis controller 116 that controls one or more synthesis modules or engine. The synthesis controller 116 can generate design data representing a design implementation of a physical device (e.g., a semiconductor chip) in terms of logic gates. An input interface 112 (e.g., keyboard, mouse) may be used to develop the logic design which is stored in one or more memory devices 113 of the processing system 110.

The results of the synthesis controller 116 are output to a yield optimization controller 117, which can extract timing information from design data input to the processing system 110 and can identify one or more yield improvable cells described by the design data. The timing information can describes, for example, a slack related to a given timing path of a semiconductor chip. In one or more non-limiting embodiments, the yield optimization controller 117 performs a slack analysis and optimization process, which indicates positive and/or negative slacks at a given node of a timing path. Latches with "unbalanced" slacks can be optimized using statistical timing tools capable of performing clock skew scheduling. These statistical timing tools operate to balance the slacks as best it can by adjusting the arrival time of the clock. A report can be generated and the in-core design can be updated with these new constraints. Because the logic cell is not yet flattened at this stage of the design process, one or more timing paths can be modified to tune the slack, which in turn tunes the resulting yield produced by a given timing path.

A routing controller 118 receives the netlists generated by the synthesis operation along with the yield optimization results for providing a maximum yield or the best yield. The routing controller 118 utilizes one or more routing algorithms to perform wire routing (also referred to simply as "routing"). During the routing, the routing controller 118 adds wires, or routes, needed to properly connect the placed components while obeying all design rules for the IC. The routes represent wires which will be needed to deliver power, providing timing signals, communicate data, etc. Because the yield optimization controller 117 is implemented between the synthesis controller 116 and the routing controller 118, the routing is performed while taking into account the maximum yield results provided by the yield optimization controller 117. Unlike conventional design systems, multiple synthesis and routing iterations are not required to tune the yield because the routing controller 118 can perform a single routing process using the best yield results confirmed earlier during the yield optimization process.

An output interface 119 (e.g., display, output port) displays a graphical layout or design resulting from the synthesis and/or provides information to place and route components of the physical implementation 120 (e.g., chip). The information includes, but is not limited to, the logic circuit element placement (e.g., latch placement location, gate placement location, etc.), critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

A slack benefit is a value indicating an improvement or degradation in slack timing provided by relocating a gate to a free-space. For instance, a critical path can include at least one gate coupled thereto that defines an initial slack timing value. Relocating the gate to a free-space may either improve the slack timing or degrade the slack timing. Thus, the slack benefit is essentially the amount of time (e.g., +/− picoseconds) by which the slack time is modified with respect to the initial slack timing.

Figure 4:
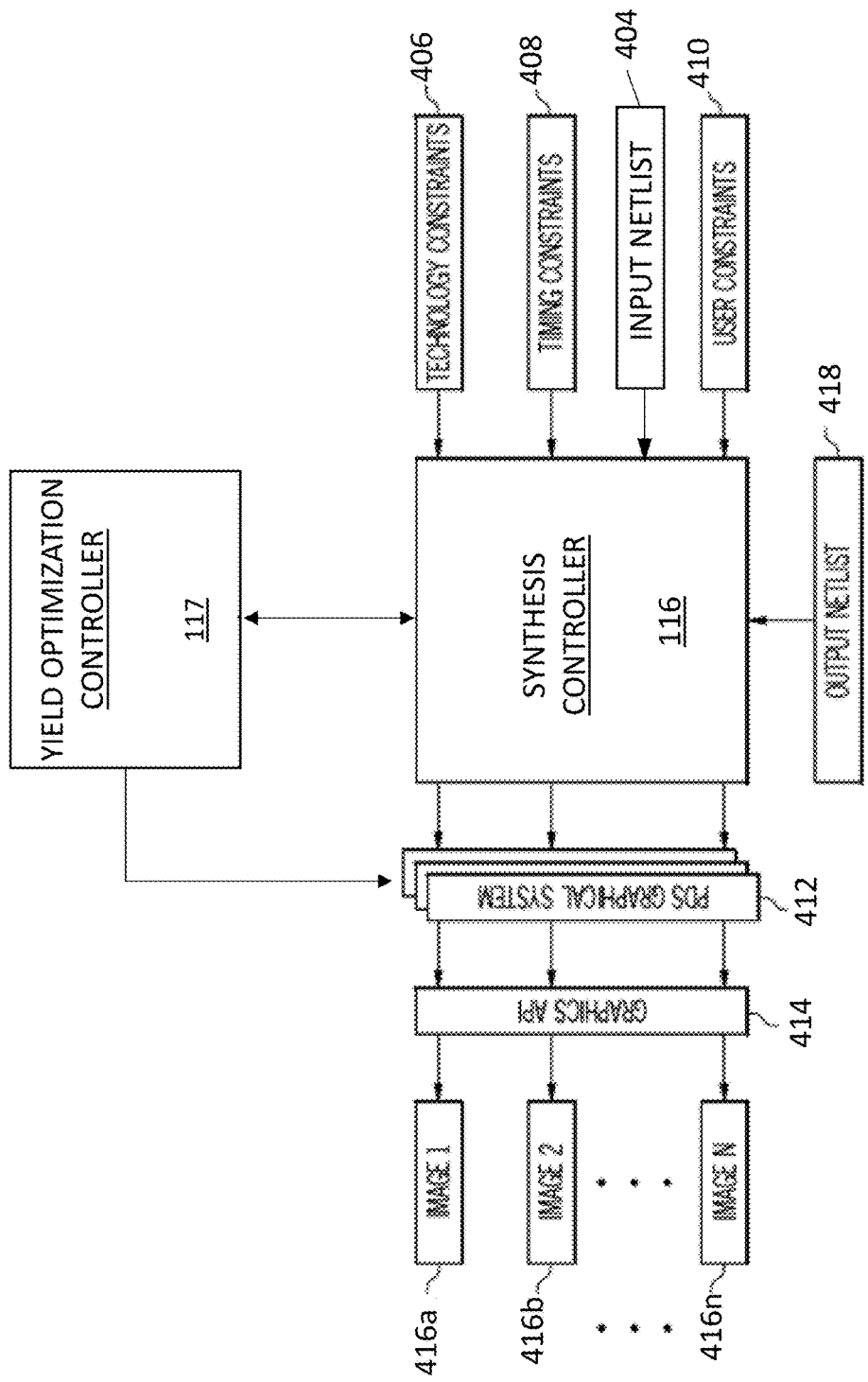
FIG. 4 is a block diagram of a synthesis controller included in a semiconductor design and layout system according to a non-limiting embodiment of the invention.

The physical implementation 120 includes creating components (e.g., transistors, resistors, capacitors) and interconnections between them on a semiconductor (e.g., silicon wafer). The physical layout of circuit sub-blocks 125 affects the length of a connecting wire between components and, thus, the timing of signals between them, for example Turning to FIG. 4, a synthesis controller 116 in signal communication with a yield optimization controller 117 is illustrated according to a non-limiting embodiment of the invention. The synthesis controller 116 is configured to receive input data, which includes, but is not limited to, an input netlist 404 that describes the chip design and cell logic layout, technology constraints 406, timing constraints 408, and user constraints 410. The cell logic layout includes the placement and routing of a group of logic elements (e.g., latches) that define a given timing path. The constraints 406-418 can be considered as secondary inputs for optimizing the netlist 404. Once the input data 404 is provided to the synthesis controller 116, the synthesis controller 116 optimizes the netlist 404 based on the constraints 406-418. More specifically, once the input netlist 404 describing the cell logic layout of the chip design is received, placement of the cell logic layout is performed to obtain a physical design of the chip. The netlist 404 can be synthesized and then optimized using the constraints 406-418 when performing timing and yield optimization processes.

In one or more embodiments, the synthesis controller 116 and yield optimization controller 117 each communicate with a graphical system 412. Accordingly, that graphical system 412 can produce image data 416A-416N based on the outputs provided by the synthesis controller 116 and/or yield optimization controller 117. The image data 416A-416N includes, for example, graphical images of unbalanced slack data and/or placement location data based on data provided by the synthesis controller 116, along with graphical images that identify logic elements included in a given timing path which provide an improved yield (e.g., the best yield results) based on data provided by the yield optimization controller 117. The images can be generated automatically, manually or both.

In accordance with one exemplary embodiment, the yield optimization controller 117 operably interacts with the graphical system 412 and a graphics application program interface (API) module 414 in order to produce graphical images 416a-416n indicative of yield improvement data. In accordance with one embodiment, the graphics API module 414 is a graphics software package (e.g., plotutils, or any other available software package developed externally or in-house) that generates the "images" (e.g., produces a JPEG file based on the data from the graphical system 412). At the conclusion of placement driven synthesis, an output netlist 418 is generated in accordance with one exemplary embodiment. The output netlist 418 includes a textual report, which provides connectivity and placement information that describe the chip design and the components therein.

Figure 5:
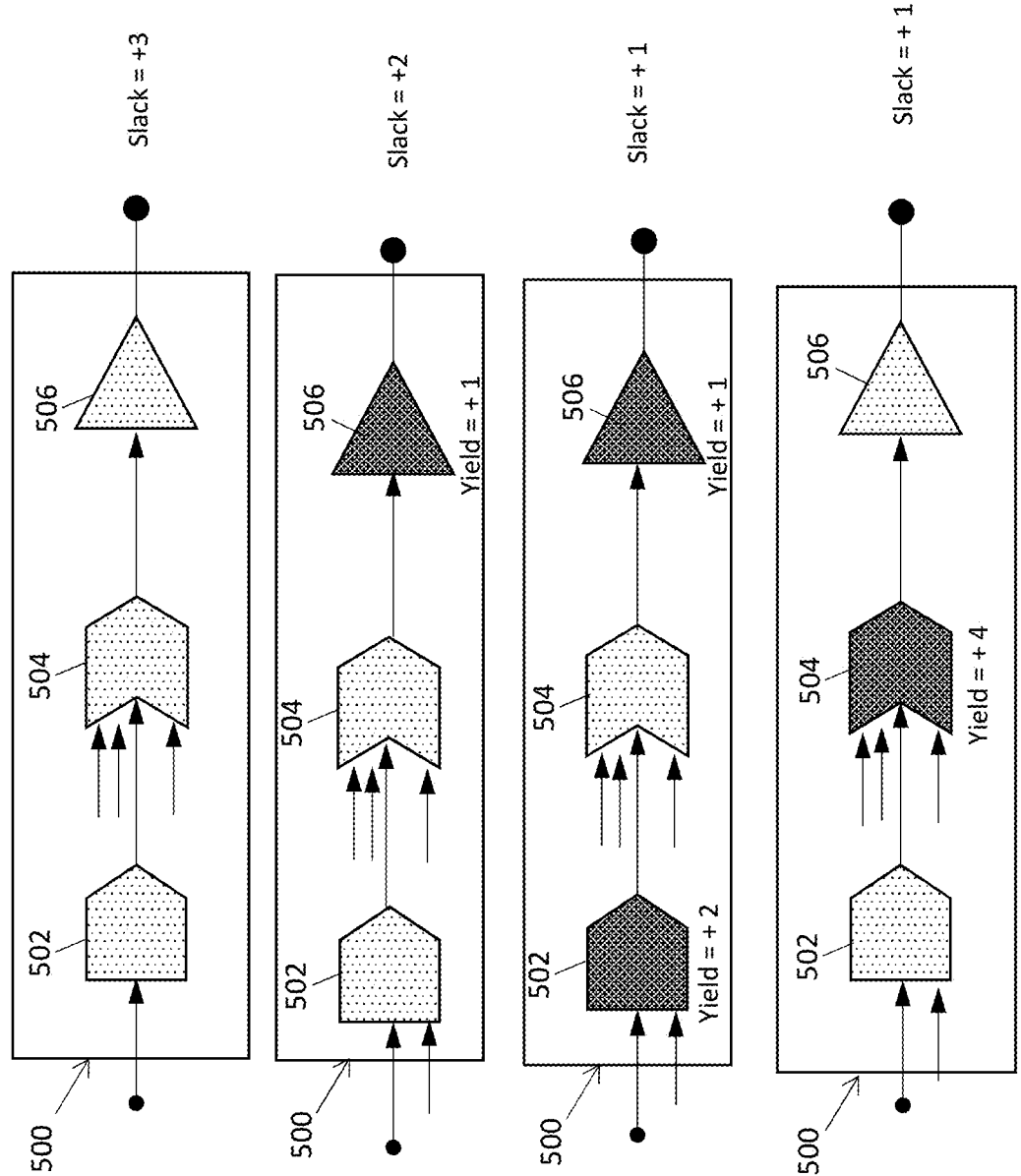
FIG. 5A is a block diagram of a timing path according to a non-limiting embodiment.
FIG. 5B is a block diagram of a timing path according to a non-limiting embodiment.
FIG. 5C is a block diagram of a timing path according to a non-limiting embodiment.
FIG. 5D is a block diagram of a timing path according to a non-limiting embodiment.

Examples of various timing paths determined by the semiconductor design and layout system 100 to provide different yields and slack results are illustrated in FIGS. 5A, 5B, 5C, and 5D. Referring to FIG. 5A, an IC layout 500 includes individual cells 502, 504, 506 that are connected to one another to define a timing path. Each cell 502, 504, 506 includes a plurality of various logic elements (not shown), which can include, but are not limited to, latches, gates, invertors, etc. Although three cells 502, 504, 506 are illustrated, it should be appreciated that the cell 500 can include many more cells. Accordingly, the yield optimization controller 117 can perform the yield optimization described herein on every cell included in a given IC layout.

The IC layout 500 is illustrated as defining a timing path having, for example, an initial slack of positive three (+3). FIGS. 5B, 5C and 5D illustrate the IC layout 500 following different yield optimization analyses, which result in variations to slack while providing improvements in the overall production yield. The yield optimization analyses includes, for example, replacing the initial footprint of one or more of the cells 502, 504, 506 with a revised footprint aimed at optimizing the yield output. In one or more embodiments, the initial footprint may be obtained from a cell library aimed at storing footprints optimized to maximizing timing performance or speed at the expense of overall production yield output, while the revised footprint may be obtained from a cell library aimed at storing footprints optimized to maximizing yield output at the expense of timing performance or speed. In addition, the yield optimization can be applied, while taking into account a timing constraint such as, for example, a targeted slack or minimum acceptable slack threshold value. In this example, the minimum acceptable slack is set as a positive one.

Turning to FIG. 5B, for example, the IC layout 500 is illustrated after replacing the initial footprint of cell 506 with an updated footprint. Accordingly, the slack is reduced to positive two (+2), while the updated cell 506 provides an improved yield output of positive one (+1).

Similarly, FIG. 5C illustrates the IC layout 500 after replacing the initial footprint of cells 502 and 506 with updated footprints, respectively, such that the slack is further reduced to positive one (+1). Accordingly, cell 506 provides a yield output of positive one (+1) while cell 502 provides an improved yield output of positive two (+2), achieving a total improved yield of positive three (+3). Therefore, the yield optimization performed in FIG. 5C achieves a better yield compared to the yield optimization performed in FIG. 5B.

Lastly, FIG. 5D illustrates the IC layout 500 after replacing the initial footprint of cell 504 with an updated footprint to achieve a slack of positive one (+1). The updated footprint of cell 504, however, provides the best total yield output of positive four (+4). Accordingly, the yield optimization performed in FIG. 5D indicates that the resulting footprints will result in an IC layout 500 having the best yield, while still achieving the minimum acceptable slack (e.g., a positive 1).

Figure 6:
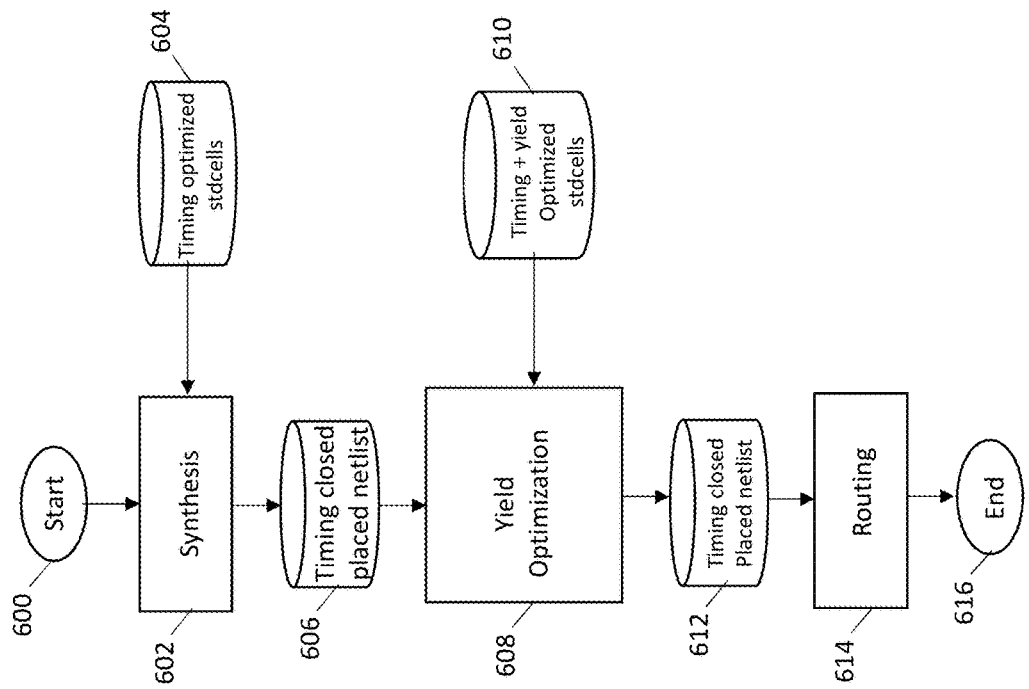
FIG. 6 is a flow diagram illustrating a method of optimizing the yield produced from a semiconductor design and fabrication process according to a non-limiting embodiment.

Turning now to FIG. 6, a method of optimizing the yield produced from semiconductor design and fabrication process is illustrated according to a non-limiting embodiment. The method begins at operation 600 and proceeds to operation 602 to perform a synthesis process, which takes into account timing information for a given cell. The timing information includes, for example, parasitic information, post-layout gate-level netlist, and device characterization information obtained from a timing optimization library ("Timing Optimization StdCell Library"). Accordingly, a timing performance check and timing analysis can be performed during the synthesis process.

In one or more non-limiting embodiments, a synthesized netlist is placed and optimized in the physical design and placement system. Scan-chain ordering is performed within the physical design and placement system environment to stitch the scan chains based on physical information, thereby achieving timing closure and optimizing the layout for routability. The synthesis process generates a gate level netlist, which is then timing closed at operation 606 using estimated interconnect loading before being physically placed.

Turning to operation 608, a yield optimization process is performed (e.g., via the yield optimization controller 117). Unlike a conventional EDA process, the yield optimization process performed at operation 608 is performed prior to the routing process. Accordingly, the yield optimization controller 117 can identify a set of yield improvable cells described by the gate level netlist generated during the synthesis along with timing and yield data from the StdLibrary 610, determine from the gate level netlist an adverse impact of yield improvement on the slack defined by a given timing path, based on the timing information and the determined adverse impact, calculate a subset of the set of yield improvable cells, and modify the subset of yield improvable cells so that the production yield is improved.

In one or more embodiments, the yield optimization controller 117 modifies the subset of yield improvable cells by switching the timing improved cells to yield improved cells with metal enlarged around the vias. In addition, the yield optimization controller 117 can calculate the subset of the set of yield improvable cells by optimizing a target function describing an overall production yield as a function of the subset to be calculated. In one or more embodiments, the subset of the set of yield improvable cells is calculated based at least in part on constraints derived from the timing information and the adverse impact of yield improvement on the slack. In this manner, cells could be switched e.g., replaced or modified) to determine the best overall production yield provided by a given cell without reducing the slack below a targeted slack threshold value.

Once a targeted improved production yield (e.g., a maximum yield or the best yield) is determined, an updated gate level netlist that provides the improved yield without negatively affecting the previously optimized timing is generated, which is then timing closed at operation 612. At operation 614, a routing process is performed and the process ends at operation 616. Although not illustrated, additional operations may be performed to place and route components to generate a physical implementation of the routed design (e.g., a physical chip).

Figure 7:
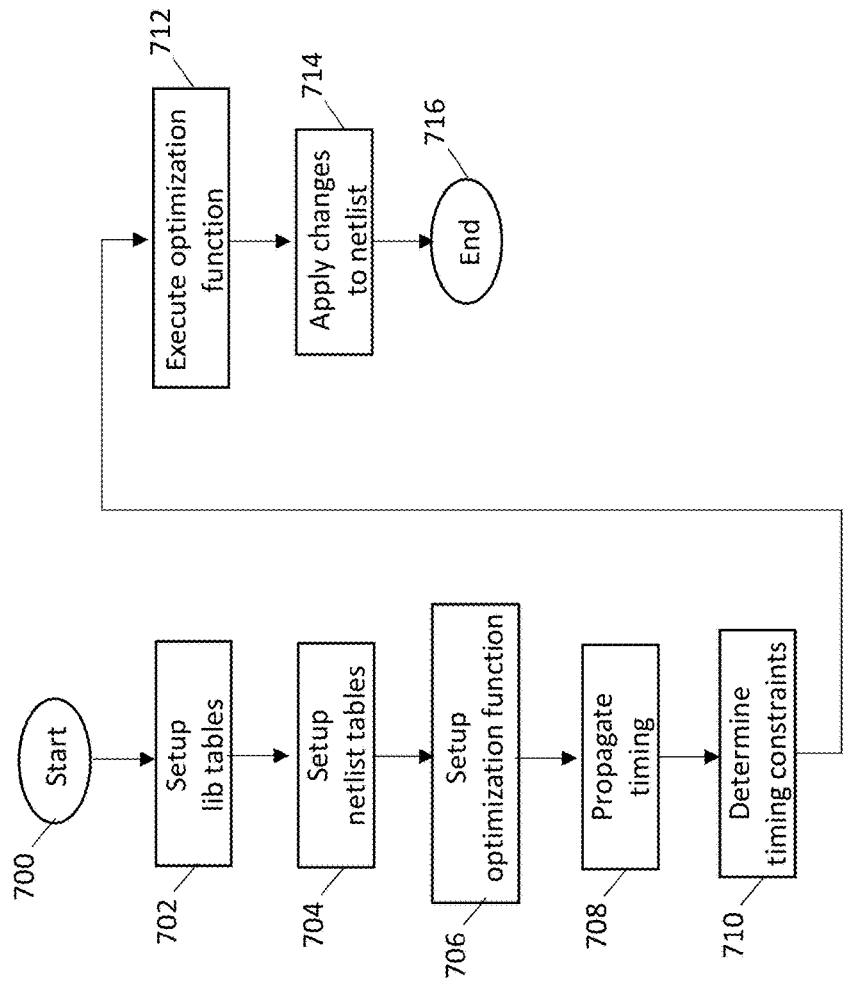
FIG. 7 is a flow diagram illustrating a method of optimizing the yield produced from a semiconductor design and fabrication process according to a non-limiting embodiment.

Referring to FIG. 7, a method of optimizing the yield produced from a semiconductor design and fabrication process according to a non-limiting embodiment. The method begins at operation 700, and at operation 702 one or more library tables including yield and timing data are generated. At operation 704, a list of all instances for the netlist is generated and filled with the belonging values of name, if it is modifiable, slack, delta slack and the gain of yield. At operation 704 a list of the connection of the netlist is generated. At operation 706, a yield optimization function is generated. The yield optimization function includes, for example, a mathematical optimization function that generates a maximized targeted value. Accordingly, the optimization function can provide an overall yield gain of the netlists. At operation 708, the currently set timing is propagated through a given cell. In one or more embodiments, the timing is propagated and a slack timing analysis is performed to measure an increase or decrease in slack from switching the cells from timing improved to yield improved ones. At operation 710, timing constraints of the cell are determined. In one or more embodiments, the timing constraints restrict the slack from exceeding a set slack threshold or target slack value. At operation 712, previously set optimization function is executed. In one or more embodiments, the optimization function can be solved using various industry-standard solver and optimizer programs such as, for example, CPLEX, which is a mathematical linear optimization solver. At operation 714, the changes indicated by the results of the executed optimization function are applied to the logical cell design, and the method ends at operation 716. Although not illustrated, additional operations may be performed to place and route components to generate a physical implementation of the routed design (e.g., a physical chip).

As described herein, various non-limiting embodiments described herein provide a system capable of improving a production yield of a semiconductor chip design process without negatively effecting the cell timing. In at least one embodiment, the system includes a yield optimization controller configured to determine a set of yield improvable cells described by a gate level netlist generated during a synthesis process, but prior to performing a flattening and routing process. In this manner, the yield optimization controller can determine an adverse impact of yield improvement on the slack, based on the timing information and the determined adverse impact, calculate a subset of the set of yield improvable cells, and modify a subset of yield improvable cells so that the production yield is improved without negatively effecting the optimized timing of the cell.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for improving a production yield of a semiconductor chip described by design data, the method comprising:

extracting, via a yield optimization controller, timing information from the design data, the timing information describing a slack related to a timing path within the semiconductor chip;

identifying, via a yield optimization controller, at least one yield improvable cell described by the design data;

determining, via a yield optimization controller, from the design data an adverse impact of yield improvement on the slack;

based on the timing information and the determined adverse impact, calculating, via a yield optimization controller, a subset of the at least one yield improvable cell; and modifying, via a yield optimization controller, the subset of the at least one yield improvable cell by modifying the design data such that a region within a metal layer surrounding a via described by the design data is enlarged so that the production yield is improved without reducing the slack below a targeted slack threshold value.

2. The computer-implemented method of claim 1, wherein enlarging the region includes increasing an overlap of the region that includes the via.

3. The computer-implemented method of claim 1, wherein calculating the subset of the at least one yield improvable cell includes optimizing a target function describing an overall production yield as a function of the subset to be calculated.

4. The computer-implemented method of claim 3, wherein the subset of the at least one yield improvable cell is calculated based at least in part on constraints derived from the timing information and the adverse impact of yield improvement on the slack.

5. The computer-implemented method of claim 1, wherein modifying the subset of the at least one yield improvable cell comprises modifying the subset of yield improvable cells by switching the timing improved cells to yield improved cells with metal enlarged around the vias.

6. A computer system configured to improve a production yield of a semiconductor chip described by design data comprises:
a synthesis controller configured to generate design data representing a design implementation of the semiconductor chip;
a yield optimization controller in signal communication with the synthesis controller, the yield optimization controller configured to extract timing information from the design data, the timing information describing a slack related to a timing path within the semiconductor chip, identify at least one yield improvable cell described by the design data, and determine from the design data an adverse impact of yield improvement on the slack,
wherein based on the timing information and the determined adverse impact, the yield optimization controller calculates a subset of the at least one yield improvable cell; and modifies the subset of the at least one yield improvable cell so that the production yield is improved,
wherein the yield optimization controller modifies the subset of the at least one yield improvable cell comprises in response to modifying the design data such that a region within a metal layer surrounding a via described by the design data is enlarged to improve the production yield without reducing the slack below a targeted slack threshold value.

7. The computer system of claim 6, wherein the yield optimization controller in response to increasing an overlap of the region that includes the via.

8. The computer system of claim 6, wherein the yield optimization controller calculates the subset of the at least one yield improvable cell in response to optimizing a target function describing an overall production yield as a function of the subset to be calculated.

9. The computer system of claim 8, wherein the subset of the at least one yield improvable cell is calculated based at least in part on constraints derived from the timing information and the adverse impact of yield improvement on the slack.

10. The computer system of claim 6, wherein modifying the subset of the at least one yield improvable cell comprises modifying the subset of yield improvable cells by switching the timing improved cells to yield improved cells with metal enlarged around the vias.

11. A computer program product for improving a production yield of a semiconductor chip described by design data, the computer program product comprising:
a non-transitory computer readable storage medium having program instructions embodied therewith, the program instructions readable by a processing circuit to cause the processing circuit to perform a method comprising:
extracting, via a yield optimization controller, timing information from the design data, the timing information describing a slack related to a timing path within the semiconductor chip;
identifying, via a yield optimization controller, at least one yield improvable cell described by the design data;
determining, via a yield optimization controller, from the design data an adverse impact of yield improvement on the slack;
based on the timing information and the determined adverse impact, calculating, via a yield optimization controller, a subset of the at least one yield improvable cell; and
modifying, via a yield optimization controller, the subset of the at least one yield improvable cell by modifying the design data such that a region within a metal layer surrounding a via described by the design data is enlarged so that the production yield is improved without reducing the slack below a targeted slack threshold value.

12. The computer program product of claim 11, wherein enlarging the region includes increasing an overlap of the region that includes the via.

13. The computer program product of claim 11, wherein calculating the subset of the at least one yield improvable cell includes optimizing a target function describing an overall production yield as a function of the subset to be calculated.

14. The computer program product of claim 13, wherein the subset of the at least one yield improvable cell is calculated based at least in part on constraints derived from the timing information and the adverse impact of yield improvement on the slack.

15. The computer program product of claim 11, The computer-implemented method of claim 1, wherein modifying the subset of the at least one yield improvable cell comprises modifying the subset of yield improvable cells by switching the timing improved cells to yield improved cells with metal enlarged around the vias.

* * * * *